(12) United States Patent
Wang et al.

(10) Patent No.: US 10,267,954 B2
(45) Date of Patent: Apr. 23, 2019

(54) NEAR EYE DISPLAY DEVICE AND METHOD

(71) Applicant: BOE TECHNOLOGY GROUP CO., LTD., Beijing (CN)

(72) Inventors: Can Wang, Beijing (CN); Yafeng Yang, Beijing (CN); Jian Gao, Beijing (CN); Can Zhang, Beijing (CN); Xinli Ma, Beijing (CN); Wei Wang, Beijing (CN); Jifeng Tan, Beijing (CN); Xiaochuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 36 days.

(21) Appl. No.: 15/562,571

(22) PCT Filed: Mar. 29, 2017

(86) PCT No.: PCT/CN2017/078524
§ 371 (c)(1),
(2) Date: Sep. 28, 2017

(87) PCT Pub. No.: WO2018/023987
PCT Pub. Date: Feb. 8, 2018

(65) Prior Publication Data
US 2018/0356567 A1 Dec. 13, 2018

(30) Foreign Application Priority Data

Aug. 4, 2016 (CN) .......................... 2016 1 0634526

(51) Int. Cl.
*G02F 1/03* (2006.01)
*G02F 1/07* (2006.01)
(Continued)

(52) U.S. Cl.
CPC ....... *G02B 3/0056* (2013.01); *G02B 27/0018* (2013.01); *G02B 27/01* (2013.01); *G02F 1/29* (2013.01)

(58) Field of Classification Search
CPC ............ G02B 19/0028; G02B 19/0047; G02B 26/0841; G02B 27/01; G02B 27/0172;
(Continued)

(56) References Cited

U.S. PATENT DOCUMENTS 9,538,165 B2 * 1/2017 Tatsuta ................. H04N 13/351
2005/0007673 A1 1/2005 Chaoulov et al.
(Continued)

FOREIGN PATENT DOCUMENTS

CN 1737638 A 2/2006
CN 103823305 A 5/2014
(Continued)

OTHER PUBLICATIONS

International Search Report of PCT/CN2017/078524 in Chinese, dated May 27, 2017 with English translation.
(Continued)

*Primary Examiner* — Brandi N Thomas
(74) *Attorney, Agent, or Firm* — Collard & Roe, P.C.

(57) ABSTRACT

A near eye display device and method are provided. The near eye display device including: a display panel and a lens module. The display panel includes a plurality of display areas arranged in an array, each of the display areas includes at least one pixel unit; and the lens module includes a plurality of micro-lenses arranged in an array, which include a plurality of deflection micro-lenses, an end of the deflection micro-lenses close to a center of the lens module is closer to the display panel than an end of the deflection micro-lenses far away from the center of the lens module, each of the display areas corresponds to at least one of the
(Continued)

micro-lenses, and an adjacent portion of two adjacent display areas of the display areas corresponds to two different micro-lenses of the micro-lenses, and the two different micro-lenses include at least one of the deflection micro-lenses.

20 Claims, 6 Drawing Sheets

(51) Int. Cl.
*G02F 1/153* (2006.01)
*G02B 27/10* (2006.01)
*G02B 3/00* (2006.01)
*G02B 27/01* (2006.01)
*G02B 27/00* (2006.01)
*G02F 1/29* (2006.01)

(58) Field of Classification Search
CPC .... G02B 2027/0123; G02B 2027/0154; G02B 27/0012; G02B 27/0018; G02B 27/0176; G02B 27/02; G02B 27/144; G02B 27/2214; G02B 3/0037; G02B 3/0056; H04N 5/7416; H04N 5/7458; H04N 9/3114; H04N 9/3141; H04N 13/344; H04N 13/383; H04N 13/398; H04N 5/64

USPC ....... 359/237, 242, 267, 290–291, 298, 315, 359/618–621, 623
See application file for complete search history.

(56) References Cited

U.S. PATENT DOCUMENTS

| | | |
|---|---|---|
| 2015/0049390 A1 | 2/2015 | Lanman et al. |
| 2015/0091789 A1 | 4/2015 | Alzate |
| 2016/0033769 A1 | 2/2016 | Kang et al. |

FOREIGN PATENT DOCUMENTS

| | | |
|---|---|---|
| CN | 105319715 A | 2/2016 |
| CN | 106019605 A | 10/2016 |

OTHER PUBLICATIONS

Notice of Transmittal of the International Search Report of PCT/CN2017/078524 in Chinese, dated May 27, 2017.
Written Opinion of the International Searching Authority of PCT/CN2017/078524 in Chinese, dated May 27, 2017 with English translation.

* cited by examiner

110

120

NEAR EYE DISPLAY DEVICE AND METHOD

CROSS REFERENCE TO RELATED APPLICATIONS

This application is the National Stage of PCT/CN2017/078524 filed on Mar. 29, 2017, which claims priority under 35 U.S.C. § 119 of Chinese Application No. 201610634526.4 filed on Aug. 4, 2016, the disclosure of which is incorporated by reference.

TECHNICAL FIELD

Embodiments of the present disclosure relate to a near eye display device and a near eye display method.

BACKGROUND

At present, with the continuous development of the display technology, the virtual reality (VR) technology and the near eye display (NED) technology have attracted more and more attention from people. The near eye display technology is a technology which can project an image directly into a viewer's eyes, so as to realize an immersive display experience.

Usually, a screen of a near eye display device is within ten centimeters of an eyeball, the image on the screen is too near to be seen by human eyes. Therefore, the near eye display device needs to focus an image through a lens and project the image on human retina, and the image is processed through a visual nervous system, and then an enlarged virtual image appears in front of a user. Thus, the near eye display device can be used in the virtual reality technology or the near eye display technology.

SUMMARY

At least one embodiment of the present disclosure provides a near eye display device and a method. The near eye display device comprises a display panel and a lens module. The display panel comprises a plurality of display areas arranged in an array, and each of the display areas comprises at least one pixel unit; and the lens module comprises a plurality of micro-lenses arranged in an array, the micro-lenses comprise a plurality of deflection micro-lenses, an end of each of the deflection micro-lenses close to the lens module is closer to the display panel than an end of each of the deflection micro-lenses far away from the lens module, and each of the display areas corresponds to at least one of the micro-lenses, and an adjacent portion of two adjacent display areas corresponds to two different micro-lenses, and the two different micro-lenses comprise at least one of the deflection micro-lenses, the deflection micro-lenses are configured to make virtual images of the two adjacent display areas formed by using the lens module do not overlap. Thus, the micro-lenses arranged in an array in the near eye display device is capable of replacing a whole large lens, so as to reduce a weight of the near eye display device and solve a problem of image ghosting or color mixing in the micro-lenses.

At least one embodiment of the present disclosure provides a near eye display device, which comprises a display panel, the display panel comprises a plurality of display areas arranged in an array, each of the display areas comprises at least one pixel unit; and a lens module, the lens module comprises a plurality of micro-lenses arranged in an array, the micro-lenses comprise a plurality of deflection micro-lenses, an end of each of the deflection micro-lenses close to a center of the lens module is closer to the display panel than an end of each of the deflection micro-lenses far away from the center of the lens module, and each of the display areas corresponds to at least one of the micro-lenses, and an adjacent portion of two adjacent display areas of the display areas corresponds to two different micro-lenses of the micro-lenses, and the two different micro-lenses comprise at least one of the deflection micro-lenses, the deflection micro-lenses are configured to make virtual images of the two adjacent display areas formed by using the lens module do not overlap.

For example, in a near eye display device provided by an embodiment of the present disclosure, a distance from each of the display areas to a corresponding micro-lens is less than a focal length of the micro-lens.

For example, in a near eye display device provided by an embodiment of the present disclosure, in a row direction or a column direction of the micro-lenses arranged in an array, from the center of the lens module to an edge of the lens module, deflection angles of the deflection micro-lenses increase gradually.

For example, in a near eye display device provided by an embodiment of the present disclosure, in a row direction or a column direction of the micro-lenses arranged in an array, from the center of the lens module to an edge of the lens module, focal lengths of the deflection micro-lenses increase gradually.

For example, in a near eye display device provided by an embodiment of the present disclosure, each of the display areas comprises a pixel unit, the pixel units are in one-to-one correspondence with the micro-lenses.

For example, in a near eye display device provided by an embodiment of the present disclosure, each of the display areas comprises a plurality of sub-pixel units.

For example, in a near eye display device provided by an embodiment of the present disclosure, the display panel further comprises a black matrix, the black matrix is disposed among the pixel units, and a position of the lens module corresponding to the black matrix is not provided with the micro-lenses.

For example, in a near eye display device provided by an embodiment of the present disclosure, the lens module comprises an adjustable liquid crystal lens, the adjustable liquid crystal lens is configured to adjust a deflection angle of liquid crystal through being inputted with different voltages so as to form the micro-lenses.

For example, in a near eye display device provided by an embodiment of the present disclosure, the lens module comprises a curved transparent optical film, the micro-lenses are disposed on the curved transparent optical film, the curved transparent optical film is configured to deflect the deflection micro-lenses in the micro-lenses For example, in a near eye display device provided by an embodiment of the present disclosure, a refractive index of the curved transparent optical film is equal to a refractive index of air.

For example, in a near eye display device provided by an embodiment of the present disclosure, the micro-lenses comprise a planoconvex lens, a circular lens, or a cylindrical lens.

For example, in a near eye display device provided by an embodiment of the present disclosure, the display panel comprises a liquid crystal display panel, an organic light emitting diode display panel, or an electronic paper.

For example, in a near eye display device provided by an embodiment of the present disclosure, the lens module is disposed on a side of the display panel used for display.

At least one embodiment of the present disclosure provides a display method of a near eye display device, which comprising: dividing a display panel into a plurality of display areas arranged in an array, and each of the display areas comprises at least one pixel unit; disposing a plurality of micro-lenses arranged in an array on a side of the display panel used for display, and each of the display areas is correspondingly provided with at least one of the micro-lenses; disposing a plurality of deflection micro-lenses in the micro-lenses, and an end of each of the deflection micro-lenses close to a center of an array formed by a plurality of the micro-lenses is closer to the display panel than an end of each of the deflection micro-lenses far away from a center of an array formed by a plurality of the micro-lenses, two different micro-lenses of the micro-lenses corresponding to an adjacent portion of two adjacent display areas of the display areas are provided with at least one of the deflection micro-lenses, the deflection micro-lenses are configured to make virtual images of the two adjacent display areas formed by using the lens module do not overlap.

For example, in a display method of a near eye display device provided by an embodiment of the present disclosure, a distance from each of the display areas to a corresponding micro-lens is less than a focal length of the micro-lens.

For example, in a display method of a near eye display device provided by an embodiment of the present disclosure, in a row direction or a column direction of the micro-lenses arranged in an array, from a center of the lens module to an edge of the lens module, deflection angles of the deflection micro-lenses increase gradually.

For example, in a display method of a near eye display device provided by an embodiment of the present disclosure, in a row direction or a column direction of the micro-lenses arranged in an array, from a center of the lens module to an edge of the lens module, focal lengths of the deflection micro-lenses increase gradually.

BRIEF DESCRIPTION OF THE DRAWINGS

In order to clearly illustrate the technical solution of embodiments of the present disclosure, the drawings of the embodiments or related technical description will be briefly described in the following; it is obvious that the drawings in the description are only related to some embodiments of the present disclosure and not limited to the present disclosure.

DETAILED DESCRIPTION

In order to make objects, technical details and advantages of the embodiments of the present disclosure apparent, the technical solutions of the embodiments of the present disclosure will be described in a clearly and fully understandable way in connection with the drawings related to the embodiments of the disclosure. It is obvious that the described embodiments are just a portion but not all of the embodiments of the present disclosure. Based on the described embodiments herein, those skilled in the art can obtain other embodiment(s), without any inventive work, which should be within the scope of the present disclosure.

Unless otherwise defined, the technical terms or scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly.

Figure 1A:
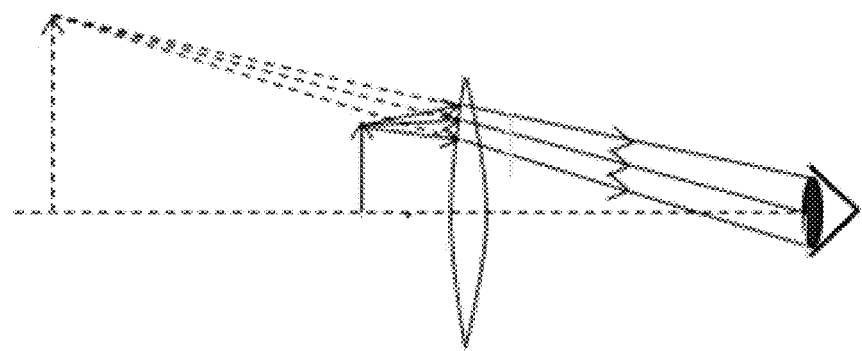
FIG. 1a is a schematic diagram of a near eye display device.
Figure 1B:
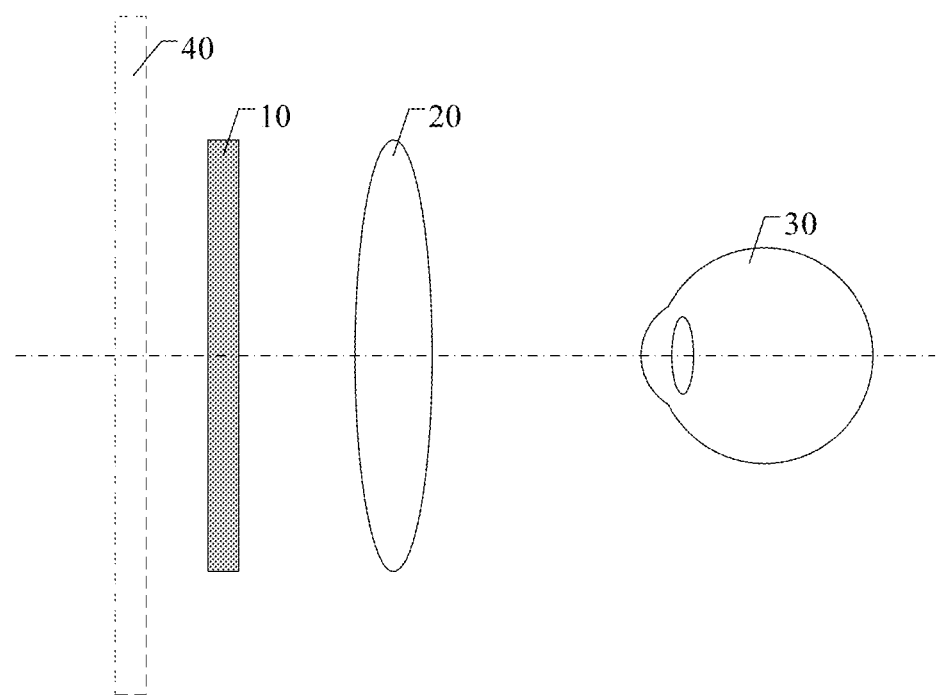
FIG. 1b is a structural schematic view of a near eye display device.

In a usual virtue reality display device, as illustrated in FIG. 1a, because of a requirement of immersion in a virtual scene, a principle of lens imaging is usually used. For example, as illustrated in FIG. 1b, the virtue reality display device includes a display screen 10 and a convex lens 20 disposed on a side of the display screen 10 used for display. The display screen 10 is disposed within a focal length of the convex lens 20, so that a remotely projected and enlarged virtual image 40 of the display screen 10 can be formed in a human eyes 30 through the convex lens 20, thereby realizing a near eye display effect and a good immersive sense. However, inventor(s) of the present application notices in a study that: in the usual virtual reality display device, there is a certain distance from the convex lens 20 to the display screen 10, and the convex lens 20 is designed to be relatively large and thick for imaging. Therefore, the usual virtual reality display device is relatively heavy, and give a wearer a bad experience.

In order to realize miniaturization and lightweight of a virtual reality display device, a micro-lens array can be adopted to replace the relatively large and thick convex lens.

Figure 2:
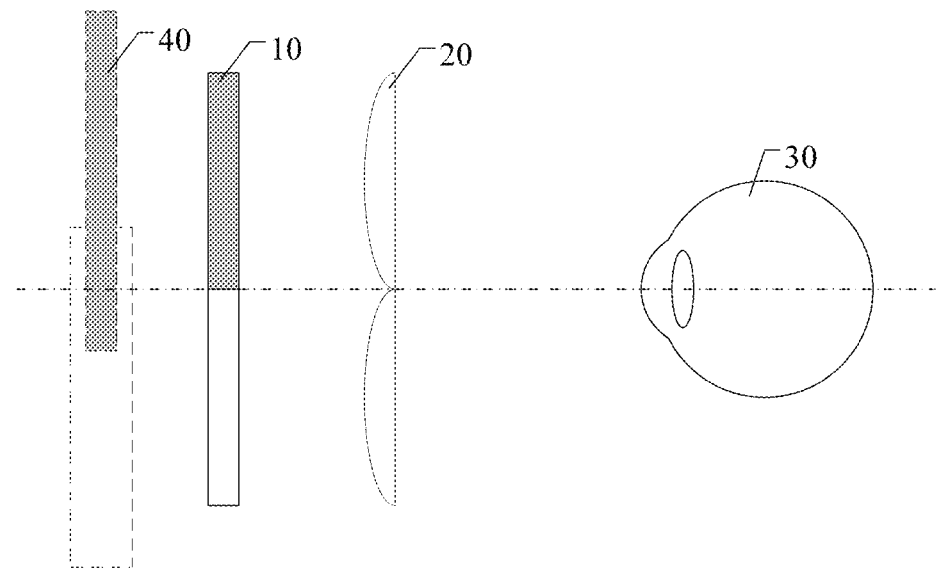
FIG. 2 is another structural schematic view of a near eye display device.

As illustrated in FIG. 2, the virtual reality display device includes a display screen 10 and a micro-lens 20, taking a case where the display screen 10 includes two sub-images (or pixels) as an example, because of the magnification effect of the micro-lens, in an virtual image 40, virtual images of the two sub-images in the display screen 10 are overlapped, so as to result in an image ghosting or a color mixing problem.

At least one embodiment of the present disclosure provides a near eye display device and a near eye display method. The near eye display device includes a display panel and a lens module. The display panel includes a plurality of display areas arranged in an array, and each of the display areas includes at least one pixel unit; and the lens module includes a plurality of micro-lenses arranged in an array, the micro-lenses include a plurality of deflection micro-lenses, and an end of each of the deflection micro-lenses close to a center of the lens module is closer to the display panel than an end of each of the deflection micro-lenses far away from the center of the lens module. Each of the display areas corresponds to at least one of the micro-lenses, and an adjacent portion of two adjacent display areas corresponds to two different micro-lenses, and the two micro-lenses include at least one of the deflection micro-lenses, and the deflection micro-lenses are configured to make virtual images of the two adjacent display areas formed by using the lens module do not overlap. Thus, the micro-lenses arranged in an array in the near eye display device is capable of replacing a whole large lens, so as to reduce the weight of the near eye display device and solve a problem of image ghosting or color mixing in the imaging of the micro-lenses.

Hereafter, a near eye display device and a display method of a near display device provided in an embodiment of the present disclosure will be described below with reference to the drawings.

First Embodiment

Figure 3A:
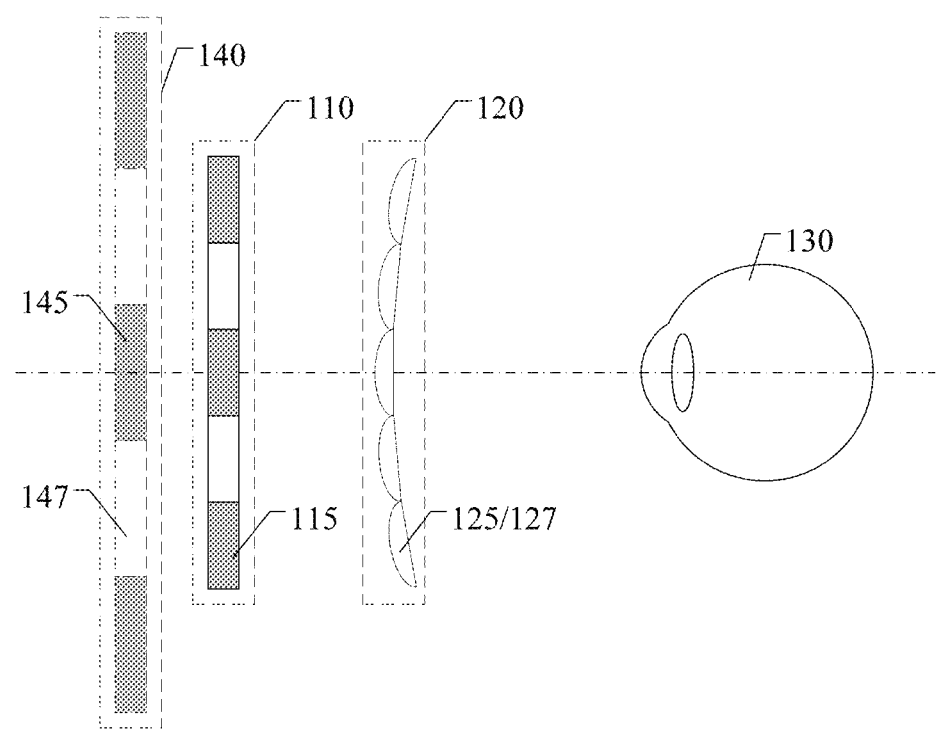
FIG. 3a is a structural schematic view of a near eye display device provided by an embodiment of the present disclosure.

An embodiment provides a near eye display device, as illustrated in FIG. 3a, the near eye display device includes a display panel 110 and a lens module 120. The lens module 120 is disposed on a side of the display panel 10 used for display, that is, the lens module 120 is formed between the display panel 110 and a human eye 130. The display panel 110 includes a plurality of display areas 115 arranged in an array, FIG. 3a is a side view of a row direction or a column direction of the display areas 115 arranged in an array. Each of the display areas 115 includes at least one pixel unit (not illustrated in FIG. 3a), therefore, each of the display areas 115 is capable of displaying an image or a pixel, and images or pixels displayed by the display areas 115 can form a complete picture for human eyes to enjoy. The lens module 120 includes a plurality of micro-lenses 125 arranged in an array, the micro-lenses 125 include a plurality of defection micro-lenses 127, an end of the deflection micro-lens 127 close to a center of the lens module 120 is closer to the display panel 110 than an end of the deflection micro-lens 127 far away from the center of the lens module 120, that is, the deflection micro-lens 127 have a certain deflection angle, and the end of the deflection micro-lens close to the lens module 120 is closer to the display panel 110 than the end of the deflection micro-lens far away from the lens module 120. Each of the display areas 115 corresponds to at least one of the micro-lenses 125, and an adjacent portion of two adjacent display areas 115 corresponds to two different micro-lenses 125, that is, each of the display areas 115 is disposed in correspondence with at least one of the micro-lenses 125 which corresponds to each of the display areas 115. The two different display areas which correspond to the adjacent portion of the two adjacent display areas 115 include at least one of the deflection micro-lenses 127, the deflection micro-lenses 127 are configured to make virtual images of the two adjacent display areas formed by using the lens module do not overlap. It should be noted that, an image displayed by the display areas 115 as mentioned above can refer to a picture or a pixel.

Figure 3B:
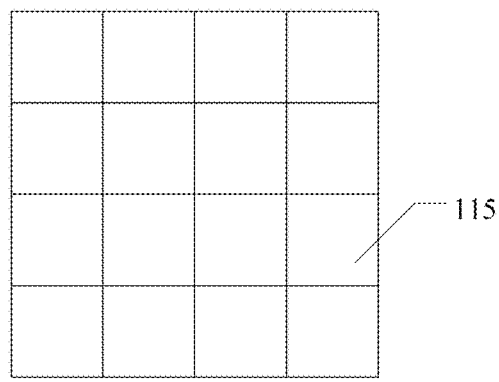
FIG. 3b is a plan view of a display panel in a near eye display device provided by an embodiment of the present disclosure.

For example, FIG. 3b is a plan view of a display area in a display panel, as illustrated in FIG. 3b, the display panel 110 includes a plurality of the display areas 115 arranged in an array.

Figure 3C:
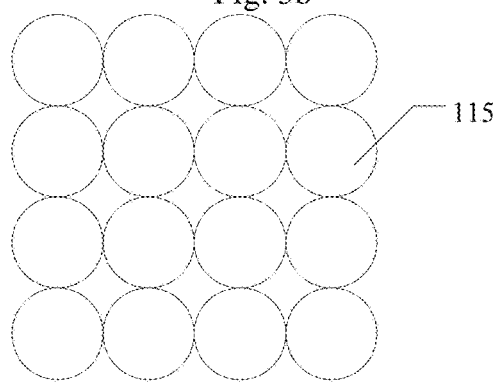
FIG. 3c is a plan view of a lens module in a near eye display device provided by an embodiment of the present disclosure.

For example, FIG. 3c is a plan view of a micro-lens in a lens module, as illustrated in FIG. 3c, the lens module 120 includes a plurality of the micro-lenses 125 arranged in an array.

For example, in a near eye display device provided by an example of the embodiment, a distance from each of the display areas to a corresponding micro-lens is less than a focal length of the micro-lens. Thus, through a role of the micro-lenses, an image or a pixel displayed by each of the display areas can form a remotely projected and enlarged virtual image in human eyes. It should be noted that, the "remotely projected" as mentioned above refers to that a distance from the virtual image to the human eyes is enlarged, that is, the distance is larger than a distance from the display panel to the human eyes, so as to avoid a problem that human cannot see clearly because the distance from the display panel to the human eyes is too close.

Figure 4:
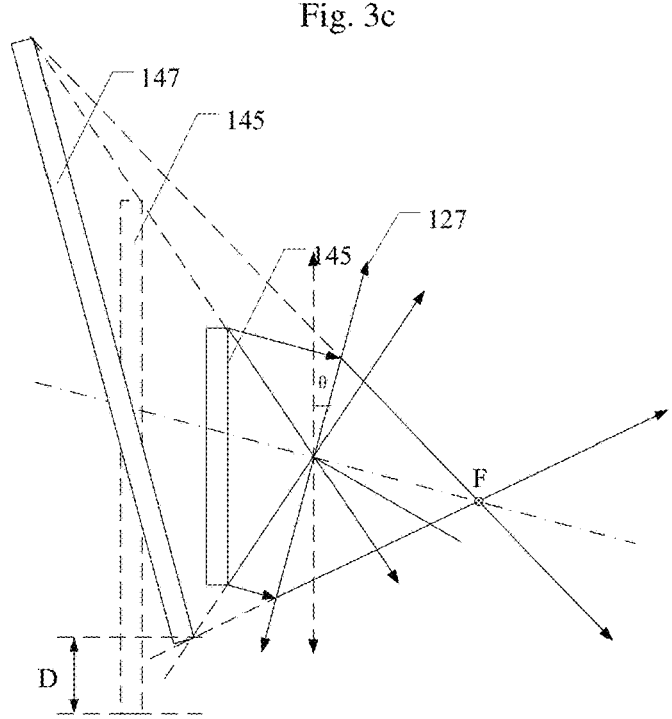
FIG. 4 is an operating principle diagram of a deflection micro-lens in a near eye display device provided by an embodiment of the present disclosure.

FIG. 4 is a schematic view showing the image formation of a deflection micro-lens. As illustrated in FIG. 4, one of the deflection micro-lenses 127 deflects a certain deflection angle θ, one of the display areas 115 forms a deflection virtual image 147 by a role of one of the deflection micro-lenses 127. Compared with a virtual image 145 formed without the role of one of the deflection micro-lenses, the deflection image 147 formed by one of the display areas 115 through the role of one of the deflection micro-lenses 127 moves a displacement distance D upwardly, therefore, at least one of the deflection micro-lenses 127 is disposed in the two different micro-lenses corresponding to an adjacent portion of the two adjacent display areas 115, so as to make virtual images of the adjacent portion of the two adjacent display areas do not overlap, and thereby avoiding an image ghosting or a color mixing problem. It should be noted that, the F illustrated in FIG. 4 refers to a focus. In order to show a role of one of the deflection micro-lenses 127 clearly, the θ value is set to be relatively large, and the deflection angle of the deflection virtual image 147 is relatively large as well. However, in the practical application, the θ value is set to be relatively small, thus, the deflection angle of the deflection virtual image 147 is relatively small, which can be negligible.

In a near eye display device provided by the embodiment, light emitted by the display panel 110 can enter the human eye 130 through a role of the lens module 120. Each of the display areas 115 corresponds to at least one of the micro-lenses 125, therefore, the at least one of the micro-lenses 125 corresponding to each of the display areas 115 can make an image displayed by the display areas 115 form a remotely projected and enlarged virtual image 145 in the human eye 130. And, the two different micro-lenses 125 which corresponds to the adjacent portion of the two adjacent display areas 115 include at least one of the deflection micro-lenses 127, therefore, the adjacent portion of the two adjacent display areas 115 can form a deflection virtual image through a role of the deflection micro-lenses 127, the deflection virtual image 147 may not be overlapped with the virtual image 145 or other virtual images 147, so as to avoid arising an image ghosting or a color mixing problem. And, the deflection virtual image 147 and the virtual image 145 can form a complete and enlarged image which is the same as an image content displayed by the whole display panel 110. Therefore, the near eye display device provided by the present embodiment can reduce the weight of the near eye display device and solve a problem of image ghosting or color mixing in the micro-lenses.

Second Embodiment

The present embodiment provides a near eye display device, as illustrated in FIG. 3a, the near eye display device includes a display panel 110 and a lens module 120. The lens module 120 is disposed on a side of the display panel 110 used for display, that is, the lens module 120 is formed between the display panel 110 and a human eye 130. The display panel 110 includes a plurality of display areas 115 arranged in an array. Each of the display areas 115 includes at least one pixel unit (not illustrated in FIG. 3a). The lens module 120 includes a plurality of micro-lenses 125 arranged in an array, the display areas 115 are in one-to-one correspondence with the micro-lenses 125, that is, one of the display areas 115 corresponds to one of the micro-lenses 125. In this case, as illustrated in FIG. 3a, except the micro-lenses 125 located in a center of the lens module 120, the other micro-lenses 125 in the lens module 120 can be deflection micro-lenses 127, so as to make virtual images of an image or a pixel displayed by each of the display areas 115 which are formed by using the lens module do not overlap. It should be noted that, in a case where the center of the lens module is not a micro-lens, but just located between two micro-lenses, all micro-lenses in the lens module can be deflection micro-lenses, so as to make virtual images of an image or a pixel displayed by each of the display areas which are formed by using the lens module do not overlap, a specific structure of the lens module is not repeated here.

For example, in a near eye display device provided by an example of the present embodiment, in a row direction or a column direction of the display areas arranged in an array, from the center of the lens module to an edge of the lens module, deflection angles of the deflection micro-lenses increase gradually. For example, as illustrated in FIG. 3a, except the micro-lenses 125 located in the center of the lens module 120, the other micro-lenses 125 in the lens module 120 can be deflection micro-lenses 127. Hereafter, a case where two deflection micro-lenses 127 above a center line of the lens module 120, illustrated in FIG. 3a, will be described as an example. A deflection virtual image formed by using a deflection micro-lens 127 which is close to the center of the lens module 120 can influence a deflection virtual image formed by using a next deflection micro-lens 127 (which is far away from the center of the lens module), therefore, the deflection micro-lens 127 far away from the center of the lens module 120 needs to be deflected greater to make the deflection virtual image formed by the the deflection micro-lens 127 shift a larger distance. For example, a plurality of the micro-lenses arranged in an array may constitute a curved surface of micro-lens.

For example, in a near eye display device provided by an example of the present embodiment, in a row direction or a column direction of the micro-lenses arranged in an array, from the center of the lens module to an edge of the lens module, focal lengths of the deflection micro-lenses increase gradually. For example, as illustrated in FIG. 3a, except the micro-lenses 125 located in the center of the lens module 120, the other micro-lenses 125 in the lens module 120 can be deflection micro-lenses 127. Hereafter, a case where two deflection micro-lenses 127 above a center line in the lens module 120, illustrated in FIG. 3a, will be described as an example. A deflection angel of a deflection micro-lens 127 far away from a center of the lens module 120 is greater than that of a deflection micro-lens 127 close to the center of the lens module 120, a distance from the deflection micro-lens 127 far away from the center of the lens module 120 to a corresponding display area 115 thereof is also greater than a distance from the deflection micro-lens 127 close to the center of the lens module 120 to a corresponding display area 115 thereof. Therefore, in order to obtain better technical effects, the focal length of the deflection micro-lens 127 far away from the center of the lens module 120 can be set to be greater to make a corresponding deflection virtual image thereof and a deflection virtual image formed by using the deflection micro-lens 127 close to the center of the lens module 120 locate on a flat surface or in a connection, and then, the deflection virtual images can form a complete and enlarged image which is the same as an image content displayed by the whole display panel 110. It should be noted that, the "connection" as mentioned above refers that the deflection virtual images formed by using the adjacent deflection lenses are connected end to end.

For example, in a near eye display device provided by an example of the present embodiment, each of the display areas can only include one pixel unit, therefore, each of the display areas can display only one pixel. Certainly, the embodiment of the present disclosure includes but is not limited thereto, each of the display areas can include a plurality of pixel units. It should be noted that, the display areas which include either a pixel or a plurality of pixels is for a reasonable design according to a size of the pixel units and a size of the micro-lens, so as to achieve an optimization of the production cost of display effects.

For example, in a near eye display device provided by an example of the present embodiment, in a case that each of the display areas only includes a pixel unit, the pixel units are in one-to-one correspondence with the micro-lenses.

Third Embodiment

Figure 5:
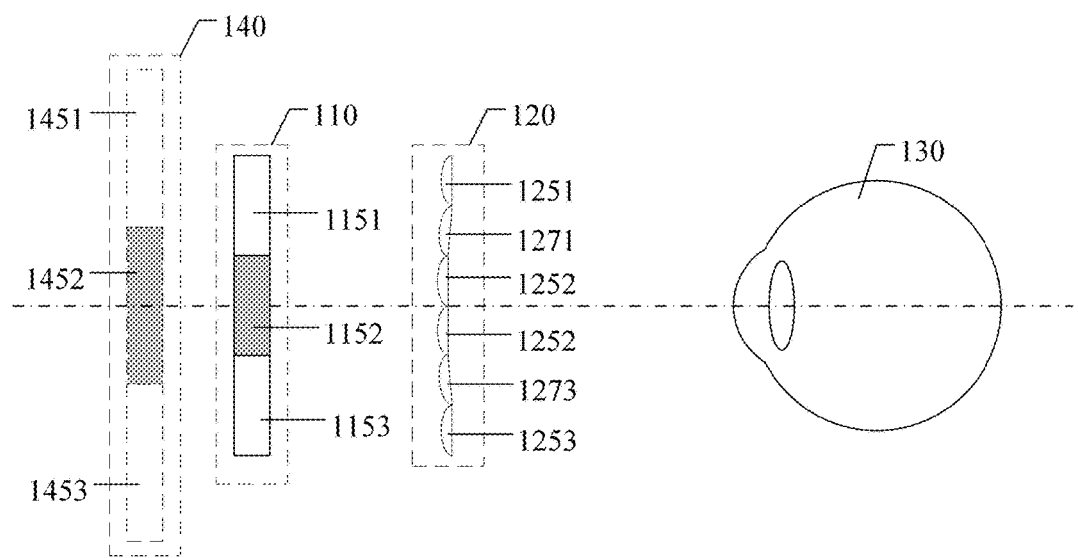
FIG. 5 is a structural schematic view of another near eye display device provided by an embodiment of the present disclosure.

On the base of the first embodiment, the present embodiment provides a near eye display device, as illustrated in FIG. 5, the near eye display device includes a display panel 110 and a lens module 120, the lens module 120 is disposed on a side of the display panel 110 used for display. The display panel 110 includes a plurality of display areas 115 arranged in an array, and each of the display areas 115 includes at least one pixel unit (not illustrated in FIG. 5), therefore, each of the display areas 115 is capable of displaying an image, images or pixels displayed by a plurality of the display areas 115 form a complete picture for human eyes to enjoy. The lens module 120 includes a plurality of micro-lenses 125 arranged in an array, the micro-lenses 125 include a plurality of defection micro-lenses 127, an end of the deflection micro-lenses 127 close to the lens module 120 is closer to the display panel 110 than an end of the deflection micro-lenses 127 far away from the lens module 120, that is, the deflection micro-lenses 127 have a certain deflection angle, and the end of the deflection micro-lens 127 close to the lens module 120 is closer to the display panel 110 than the end of the deflection micro-lens 127 far away from the lens module 120. As illustrated in FIG. 5, each of the display areas 115 corresponds to two micro-lenses 125 respectively, that is, each of the display areas 115 is disposed in correspondence with at least one of the micro-lenses 125 which corresponds to each of the display area 115. The two different display areas which corresponds to the adjacent portion of the two adjacent display areas 115 includes at least one of the deflection micro-lenses 127, the deflection micro-lenses 127 are configured to make virtual images of the two adjacent display areas formed by using the lens module do not overlap.

For example, a case where the display panel 110 includes three display areas 115, that is, a first display area 1151 located on an upper portion of the display panel 110, a second display area 1152 a second display area 1152 located on a center of the display panel 110, and a third display area 1153 located on a lower portion of the display panel 110, the first display area 1151, the second display area 1152 and the third display area 1153 correspond to the two micro-lenses respectively will be described as an example. As illustrated in FIG. 5, because the second display area 1152 is located in the center of the display panel 110, the two micro-lenses corresponding to the second display area 1152 may not deflect, that is, the two micro-lenses are the micro-lenses 1252. And an enlarged virtual image 1452 of the second display area 1152 is formed in human eyes by a role of the two micro-lenses 1252. In this case, virtual images respectively formed by using the two micro-lenses 1252 may be overlapped with each other, but because the virtual images belong to the second display area 1152, an impact on display effects can be reduced or even eliminated through a reasonable design. For example, the display areas can be designed to display a single color image, or an overlapping portion of the virtual images takes up a space of a black matrix exactly. Especially, in a case where the display area only include one pixel, an overlapping portion generated by the virtual images of the pixel which is respectively formed by using the two micro-lenses 1252 has no effect on the display effects. The first display area 1151 is adjacent to the second display area 1152, therefore, assuming that the two micro-lenses corresponding to the first display area 1151 do not deflect, the enlarged virtual image 1452 of the second display area 1152 can be overlapped with the virtual image formed by the first display area 1151, so as to influence the display effects. Therefore, the two micro-lenses corresponding to the first display area 1151 need to deflect (that is, the two micro-lenses include at least one of the deflection micro-lenses) so as to make the virtual image formed by the first display area 1151 be not overlapped with the enlarged virtual image 1452 of the second display area 1152.

For example, as illustrated in FIG. 5, in the two micro-lenses corresponding to the first display area 1151, a micro-lens corresponding to an adjacent portion of the first display area 1151 and the second display area 1152 is a deflection micro-lens 1271, and the other micro-lens 1251 does not deflect (that is, the micro-lens 1251 is not a deflection micro-lens). Thus, through a role of the deflection micro-lens 1271, the adjacent portion of the first display area 1151 and the second display area 1151 can form a deflection virtual image, and the deflection virtual image may displace a certain distance upward, so that the deflection virtual image may not be overlapped with the enlarged virtual image 1452 of the second display area. Because of the micro-lens 1252 does not deflect, the deflection virtual image formed by using the deflection micro-lens 1271 and the virtual image formed by using the micro-lens may be overlapped, however, because the deflection virtual image and the virtual image belong to the first display area 1152, an impact on display effects can be reduced or even eliminated through a reasonable design. For example, the display areas can be designed to display a single color image, or an overlapping portion of the virtual images takes up a space of a black matrix exactly. Especially, in a case where the display areas only include a pixel unit, a generating overlapping portion between the deflection image formed by using the deflection micro-lens 1271 and the virtual image formed by using the micro-lenses almost have no effect on the display effects. It should be noted that, in the near eye display device provided by the embodiment, because an offset of the deflection virtual image formed by using the deflection micro-lens 1271 is within a range of the virtual image formed by the micro-lens 1251, the offset of the deflection virtual image formed by using the deflection micro-lens 1271 may not influence a next (further away from the center of the display panel than the first display area) display area. Therefore, in a row direction or a column direction of the micro-lenses arranged in an array, from the center of the lens module to the edge of the lens module, deflection angles of the deflection micro-lenses may not increase. Similarly, the focal length of the deflection micro-lens may not increase.

It should be noted that, an embodiment of the present disclosure includes but is not limited thereto, in the embodiment as mentioned above, the two micro-lenses corresponding to the display areas can also deflect. Furthermore, each of the display areas is not limited to correspond to two micro-lenses, but also correspond to other numbers of micro-lenses, for example, three micro-lenses, four micro-lenses, or five micro-lenses.

Fourth Embodiment

Figure 6A:
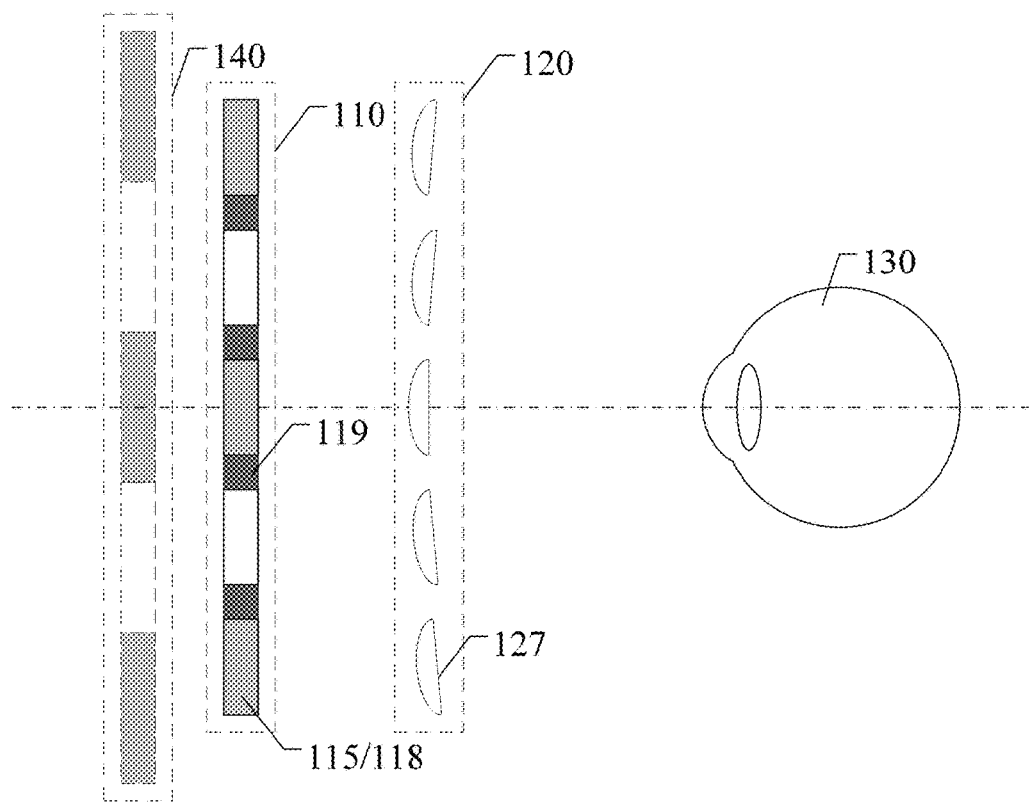
FIG. 6a is a structural schematic view of another near eye display device provided by an embodiment of the present disclosure.

On the base of the second embodiment, the present embodiment provides a near eye display device, as illustrated in FIG. 6a, each of the display areas 115 only includes a pixel unit 118, the pixel units 118 are in one-to-one correspondence with the micro-lenses 125. The display panel 110 further includes a black matrix 119 disposed among the pixel units 118. A position of the lens module 120 corresponding to the black matrix 119 is not provided with the micro-lenses 125. Thus, the enlarged virtual image of each pixel unit 118 formed through a role of the micro-lens 125 can occupy a space of the black matrix 119, so as to reduce an offset of the deflection virtual image formed by using the micro-lenses 127.

Figure 6B:
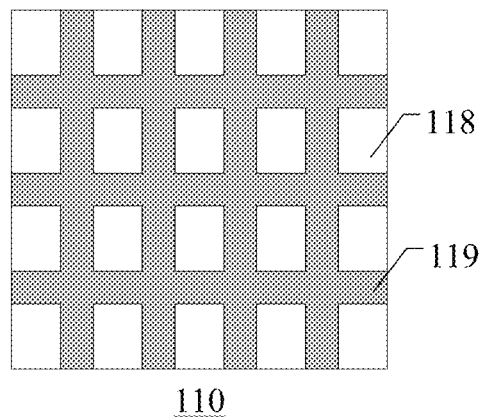
FIG. 6b is a plan view of a display panel in another near eye display device provided by an embodiment of the present disclosure.

For example, as illustrated in FIG. 6b, the display panel 110 includes a plurality of pixel units 118 arranged in an array and the black matrix 119 disposed among the pixel units 118. It should be noted that, in the embodiments of the present disclosure, cases where each of the display areas or the pixel units have a rectangular or a square shape are described as examples, however, the embodiments of the present disclosure include but are not limited thereto, according to the practical requirement, the display areas or the pixel units may further include other shapes, such as eight edges.

Fifth Embodiment

Figure 7:
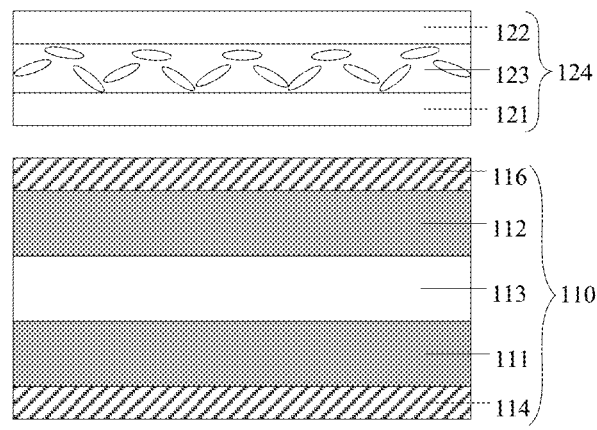
FIG. 7 is a sectional view of a near eye display device provided by an embodiment of the present disclosure.

On the base of the first embodiment to the fourth embodiment, as illustrated in FIG. 7, the lens module 120 may include an adjustable liquid crystal lens 124, the adjustable liquid crystal lens 124 includes a bottom substrate 121, an upper substrate 122 cell assembled with the bottom substrate 121, and a liquid crystal layer 123 disposed between the bottom substrate 121 and the upper substrate 122. The adjustable liquid crystal lens 142 is configured to generate a different electric field at different regions of the bottom substrate 121 and the upper substrate 122 through being inputted with different voltages so as to adjust a deflection angle of liquid crystal in the liquid crystal layer 123, and then form the micro-lenses 125.

For example, the bottom substrate may include a plurality of independently separated strip or block electrodes, the upper substrate may include a plate electrode, by applying different voltages on the independently separated strip or block electrodes in the bottom substrate, and applying a common voltage on the plate electrode in the upper substrate, the effect that different electrode fields are generated in different regions of the upper substrate and the bottom substrate can be achieved, so as to adjust the deflection angle of liquid crystal in the liquid crystal layer, so as to form the micro-lenses. It should be noted that, the embodiment of the present disclosure includes but is not limited thereto, the electrode of the upper substrate can further be a plurality of independently separated strip or block electrodes in one-to-one correspondence with the electrodes in the bottom substrate.

For example, in a near eye display device provided by an example of the present embodiment, as illustrated in FIG. 7, a display panel 110 includes an array substrate 111, an opposing substrate 112 cell assembled with the array substrate 112, a liquid crystal layer 113 disposed between the array substrate 111 and the array substrate 112, a first polarizer 114 disposed on a side of the array substrate far away from the liquid crystal layer 113 and a second polarizer 116 disposed on a side of the opposing substrate 112 far away from the liquid crystal 113. That is, the display panel 110 is a liquid crystal display panel. Certainly, the embodiment of the present disclosure includes but is not limited thereto, the display panel may further be an organic light emitting diode display panel or an electronic paper.

Sixth Embodiment

Figure 8:
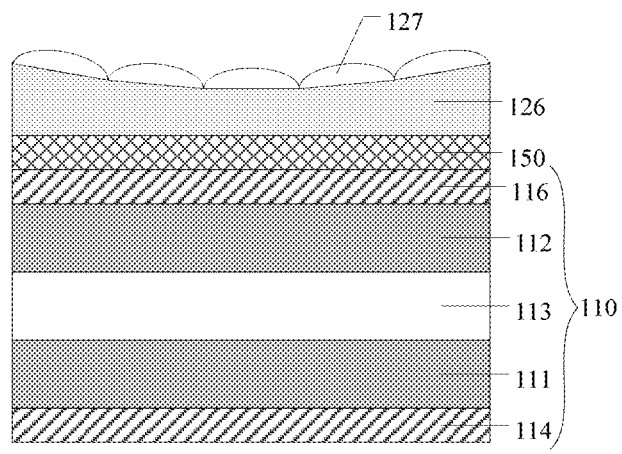
FIG. 8 is a sectional view of another near eye display device provided by an embodiment of the present disclosure.

On the base of the first embodiment to the fourth embodiment, as illustrated in FIG. 8, the lens module 120 includes a curved transparent optical film 136. The micro-lenses are disposed on the curved transparent optical film 136, and the curved transparent optical film 126 is configured to deflect the deflection micro-lenses 127 in the micro-lenses. As illustrated in FIG. 8, because an upper surface of the curved transparent optical film 126 is a curved surface, the deflection micro-lenses 127 disposed on the upper surface of the curved transparent optical film 126 have a certain deflection angle with the upper surface. By designing s shape of the upper surface of the curved transparent optical film 126, various arrangements of the micro-lenses in the first embodiment to the fourth embodiment can be achieved. Certainly, the embodiment of the present disclosure includes but is not limited thereto, each of the micro-lenses can also be integrally molded to achieve the various arrangements of the micro-lenses in the first embodiment to the fourth embodiment.

For example, in a near eye display device provided by an example of the present embodiment, a refractive index of the curved transparent optical film is equal to a refractive index of air. Thus, it can be prevented that the transparent optical film refracts light emitted by the display panel and thereby affecting the display effects.

For example, in a near eye display device provided by an example of the present embodiment, the lens micro-lenses include a planoconvex lens, a circular lens, or a cylindrical lens. It should be noted that, according to the practical demand, in a case where an image displayed by the display panel is enlarged in only one direction, the micro-lenses are capable of adopting cylindrical lenses. In this case, a extend direction of the cylindrical lenses is vertical to a direction of the image of the display panel which needs to be enlarged.

For example, in a near eye display device provided by an example of the present embodiment, as illustrated in FIG. 8, the display panel 110 includes an array substrate 111, an opposing substrate 112 cell assembled with the array substrate 112, a liquid crystal layer 113 disposed between the array substrate 111 and the array substrate 112, a first polarizer 114 disposed on a side of the array substrate far away from the liquid crystal layer 113 and a second polarizer 116 disposed on a side of the opposing substrate 112 far away from the liquid crystal 113. That is, the display panel 110 is a liquid crystal display panel. Certainly, an embodiment of the present disclosure includes but is not limited thereto, the display panel may further be an organic light emitting diode display panel or an electronic paper. Furthermore, the curved transparent optical film 126 is capable of adhering to the display panel 110 through an adhesive layer 150. Certainly, an embodiment of the present disclosure includes but is not limited thereto, the curved transparent optical film 126 can also be separated from the display panel 110.

In the first embodiment to the sixth embodiment of the present disclosure, the focal length of the micro-lenses can be calculated by a required magnification, a distance from the human eye to the micro-lenses, and a distance from the virtual image to the human eye. The deflection angle of each of the deflection micro-lenses can be determined according to a required displacement distance of the deflection virtual image formed by using each of the deflection micro-lenses. The focal length of the deflection micro-lenses can be calculated by the deflection angle of each of the deflection micro-lenses, a distance from the each of the display areas to a corresponding deflection micro-lens thereof, and a distance from each of the deflection micro-lenses to the deflection virtual image thereof. A radius of curvature of the curved surface in each of the micro-lenses can be calculated by a type of each of the micro-lenses (such as a planoconvex lens, a circular lens, or a cylindrical lens), and the focal length of each of the micro-lenses and the reflective index of the micro-lenses material. And an arch rise of each of the micro-lenses can be calculated by the radius of curvature and a size of the micro-lenses, so as to dispose the micro-lenses according to an actual demand.

Seventh Embodiment

Figure 9:
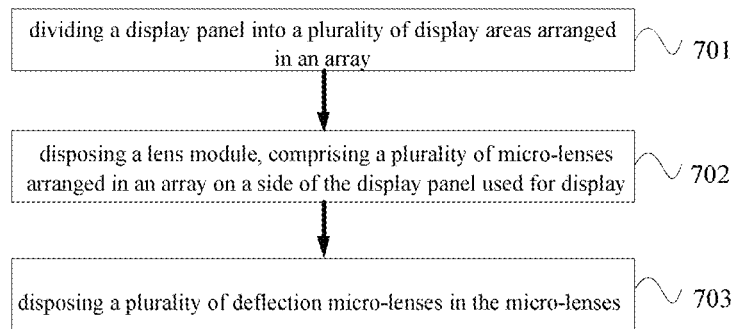
FIG. 9 is a flow chart of a near eye display method provided by an embodiment of the present disclosure.

The present embodiment provides a display method of a near eye display device, as illustrated in FIG. 9, the display method of a near eye display device includes step 701 to step 703.

Step 701: dividing a display panel into a plurality of display areas arranged in an array, and each of the display areas includes at least one pixel unit.

Step 702: disposing a plurality of micro-lenses arranged in an array on a side of the display panel used for display, that is, disposing a plurality of micro-lenses arranged in an array between the display panel and the human eye, and each of the display areas is correspondingly provided with at least one of the micro-lenses.

Step 703: disposing a plurality of deflection micro-lenses in the micro-lenses, and an end of the deflection micro-lenses close to a center of an array formed by the micro-lenses is closer to the display panel than an end of the deflection micro-lenses far away from a center of an array formed by the micro-lenses, two different micro-lenses of the micro-lenses corresponding to an adjacent portion of two adjacent display areas of the display areas are provided with at least one of the deflection micro-lenses, the deflection micro-lenses are configured to make virtual images of the two adjacent display areas formed by using the lens module do not overlap. In the display method of a near eye display device provided by the present embodiment, light emitted from the display panel can pass through an array formed by the micro-lenses to the human eye. Each of the display areas corresponds to at least one micro-lens, therefore, at least one micro-lens corresponding to each of the display areas can form a remotely projected and enlarged virtual image of an image displayed by the display areas on the human eye. And, two different micro-lenses corresponding to an adjacent portion of two adjacent display areas are provided with at least one deflection micro-lens, therefore, the adjacent portion of the two adjacent display areas can form a deflection virtual image by a role of the deflection micro-lens, the deflection virtual image cannot be overlapped with a virtual image or other deflection virtual images, so as to prevent from a problem of image ghosting or color mixing. And the deflection virtual image and the virtual image can form a complete and enlarged image which is the same as an image content displayed by the whole display panel. Therefore, the near eye display method provided by the present embodiment can reduce a weight of the near eye display device and solve a problem of image ghosting or color mixing in the micro-lenses.

For example, in a display method of a near eye display device provided by an example of the present embodiment, a distance from each of the display areas to a corresponding micro-lens is less than a focal length of the micro-lens.

For example, in a display method of a near eye display device provided by an example of the present embodiment, in a row direction or a column direction of the micro-lenses arranged in an array, from a center of the lens module to an edge of the lens module, deflection angles of the deflection micro-lenses increase gradually.

For example, in a display method of a near eye display device provided by an example of the present embodiment, in a row direction or a column direction of the micro-lenses arranged in an array, from a center of the lens module to an edge of the lens module, focal lengths of the deflection micro-lenses increase gradually.

For example, in a display method of a near eye display device provided by an example of the present embodiment, the focal length of the micro-lenses can be calculated by a required magnification, a distance from the human eye to the micro-lenses, and a distance from the virtual image to the human eye.

For example, the focal length of the micro-lenses can be calculated by a distance from the display panel to the micro-lenses, and the required magnification through a following formula:

$$\Gamma = L/f + 1 - p/f$$

Wherein, $\Gamma$ is the required magnification, f is the focal length of the micro-lenses, p is the distance from the human eye to the micro-lenses, and L is the distance from the virtual image to the human eye.

For example, in a display method of a near eye display device provided by an example of the present embodiment, the deflection angle of each of the deflection micro-lenses can be determined according to a required displacement distance of the deflection virtual image formed by using the deflection micro-lenses.

For example, in a display method of a near eye display device provided by an example of the present embodiment, the focal length of each of the deflection micro-lenses can be calculated by the deflection angle of the deflection micro-lenses, a distance from the each of the display areas to a corresponding deflection micro-lens thereof, and a distance from each of the deflection micro-lenses to the deflection virtual image thereof.

For example, in a display method of a near eye display device provided by an example of the present embodiment, a radius of curvature of the curved surface in each of the micro-lenses can be calculated by a type of each of the micro-lenses (such as a planoconvex lens, a circular lens, or a cylindrical lens), and the focal length of each of the micro-lenses and a reflective index of the micro-lenses material.

For example, in a case where the micro-lens is a planoconvex lens, the radius of curvature of the curved surface in each of the micro-lenses can be calculated by the focal length of each of the micro-lenses and the reflective index of the micro-lenses material through a following formula.

$$f = \frac{r}{n-1}$$

Wherein, f is the focal length of the micro-lenses, r is the radius of curvature of the micro-lenses, n is the reflective index of the micro-lenses material.

For example, in a display method of a near eye display device provided by an example of the present embodiment, an arch rise of each of the micro-lenses can be calculated by the radius of curvature and a size of the micro-lenses.

For example, in a case where an orthogonal projection of the micro-lenses is a circular, the arch rise of each of the micro-lenses can be calculated by the radius of curvature and the size of the micro-lenses.

$$h = r - \sqrt{r^2 - \left(\frac{P}{2}\right)^2}$$

Wherein, h is the arch rise of the micro-lenses, r is the radius of curvature of the micro-lenses, p is a diameter of the micro-lenses.

The following points should to be explained:

1) The drawings of at least one embodiment of the present disclosure only relate to the structure in the embodiment of the present disclosure, and other structures may be referenced to the usual design.

2) In a case of no conflict, features of the same embodiment or different embodiments of the present disclosure may be combined with each other.

The above are only specific implementations of the present disclosure. However the scope of the present disclosure is not limited thereto. Variations or substitutions that easily occur to any one skilled in the art within the technical scope disclosed in the present disclosure should be encompassed in the scope of the present disclosure. Therefore, the scope of the present disclosure should be based on the scope of the claims.

The present application claims priority of China Patent application No. 201610634526.4 filed on Aug. 4, 2016, the content of which is incorporated in its entirety as portion of the present application by reference herein.

What is claimed is:

1. A near eye display device, comprising:
a display panel, the display panel comprises a plurality of display areas arranged in an array, each of the display areas comprises at least one pixel unit; and
a lens module, the lens module comprises a plurality of micro-lenses arranged in an array, the micro-lenses comprise a plurality of deflection micro-lenses, an end of the deflection micro-lenses close to a center of the lens module is closer to the display panel than an end of the deflection micro-lenses far away from the center of the lens module, wherein each of the display areas corresponds to at least one of the micro-lenses, and an adjacent portion of two adjacent display areas of the display areas corresponds to two different micro-lenses of the micro-lenses, and the two different micro-lenses comprise at least one of the deflection micro-lenses, the deflection micro-lenses are configured to make virtual images of the two adjacent display areas formed by using the lens module do not overlap.

2. The near eye display device according to claim 1, wherein a distance from each of the display areas to a corresponding micro-lenses less than a focal length of the micro-lens.

3. The near eye display device according to claim 1, wherein in a row direction or a column direction of the micro-lenses arranged in an array, from the center of the lens module to an edge of the lens module, deflection angles of the deflection micro-lenses increase gradually.

4. The near eye display device according to claim 1, wherein in a row direction or a column direction of the micro-lenses arranged in an array, from the center of the lens module to an edge of the lens module, focal lengths of the deflection micro-lenses increase gradually.

5. The near eye display device according to claim 1, wherein each of the display areas comprises a pixel unit, the pixel units are in one-to-one correspondence with the micro-lenses.

6. The near eye display device according to claim 1, wherein each of the display areas comprises a plurality of sub-pixel units.

7. The near eye display device according to claim 1, wherein the display panel further comprising:
a black matrix, the black matrix is disposed among the pixel units,
wherein a position of the lens module corresponding to the black matrix is not provided with the micro-lenses.

8. The near eye display device according to claim 1, wherein the lens module comprising:
an adjustable liquid crystal lens, the adjustable liquid crystal lens is configured to adjust a deflection angle of liquid crystal through being inputted with different voltages so as to form the micro-lenses.

9. The near eye display device according to claim 1, wherein the lens module comprising:
a curved transparent optical film, the micro-lenses are disposed on the curved transparent optical film, the curved transparent optical film is configured to deflect the deflection micro-lenses in the micro-lenses.

10. The near eye display device according to claim 9, wherein a refractive index of the curved transparent optical film is equal to a refractive index of air.

11. The near eye display device according to claim 1, wherein the micro-lenses comprise a planoconvex lens, a circular lens, or a cylindrical lens.

12. The near eye display device according to claim 1, wherein the display panel comprises a liquid crystal display panel, an organic light emitting diode display panel, or an electronic paper.

13. The near eye display device according to claim 1, wherein the lens module is disposed on a side of the display panel used for display.

14. A display method of a near eye display device, comprising:
dividing a display panel into a plurality of display areas arranged in an array, wherein each of the display areas comprises at least one pixel unit;
disposing a lens module, comprising a plurality of micro-lenses arranged in an array on a side of the display panel used for display, wherein each of the display areas is correspondingly provided with at least one of the micro-lenses;
disposing a plurality of deflection micro-lenses in the micro-lenses, wherein an end of the deflection micro-lenses close to a center of an array formed by the micro-lenses is closer to the display panel than an end of the deflection micro-lenses far away from the center of an array formed by the micro-lenses, two different micro-lenses of the micro-lenses corresponding to an adjacent portion of two adjacent display areas of the display areas are provided with at least one of the deflection micro-lenses, the deflection micro-lenses are configured to make virtual images of the two adjacent display areas formed by using the lens module do not overlap.

15. The display method of a near eye display device according to claim 14, wherein a distance from each of the display areas to a corresponding micro-lens is less than a focal length of the micro-lens.

16. The display method of a near eye display device according to claim 14, wherein in a row direction or a column direction of the micro-lenses arranged in an array, from a center of the lens module to an edge of the lens module, deflection angles of the deflection micro-lenses increase gradually.

17. The near eye display device according to claim 14, wherein in a row direction or a column direction of the micro-lenses arranged in an array, from a center of the lens module to an edge of the lens module, focal lengths of the deflection micro-lenses increase gradually.

18. The near eye display device according to claim 2, wherein in a row direction or a column direction of the micro-lenses arranged in an array, from the center of the lens module to an edge of the lens module, deflection angles of the deflection micro-lenses increase gradually.

19. The near eye display device according to claim 2, wherein in a row direction or a column direction of the micro-lenses arranged in an array, from the center of the lens module to an edge of the lens module, focal lengths of the deflection micro-lenses increase gradually.

20. The near eye display device according to claim 3, wherein in a row direction or a column direction of the micro-lenses arranged in an array, from the center of the lens module to an edge of the lens module, focal lengths of the deflection micro-lenses increase gradually.

* * * * *